W. HEUSSER.
PRECISION LEVEL.
APPLICATION FILED APR. 20, 1915.
1,299,940.
Patented Apr. 8, 1919.
2 SHEETS—SHEET 1.
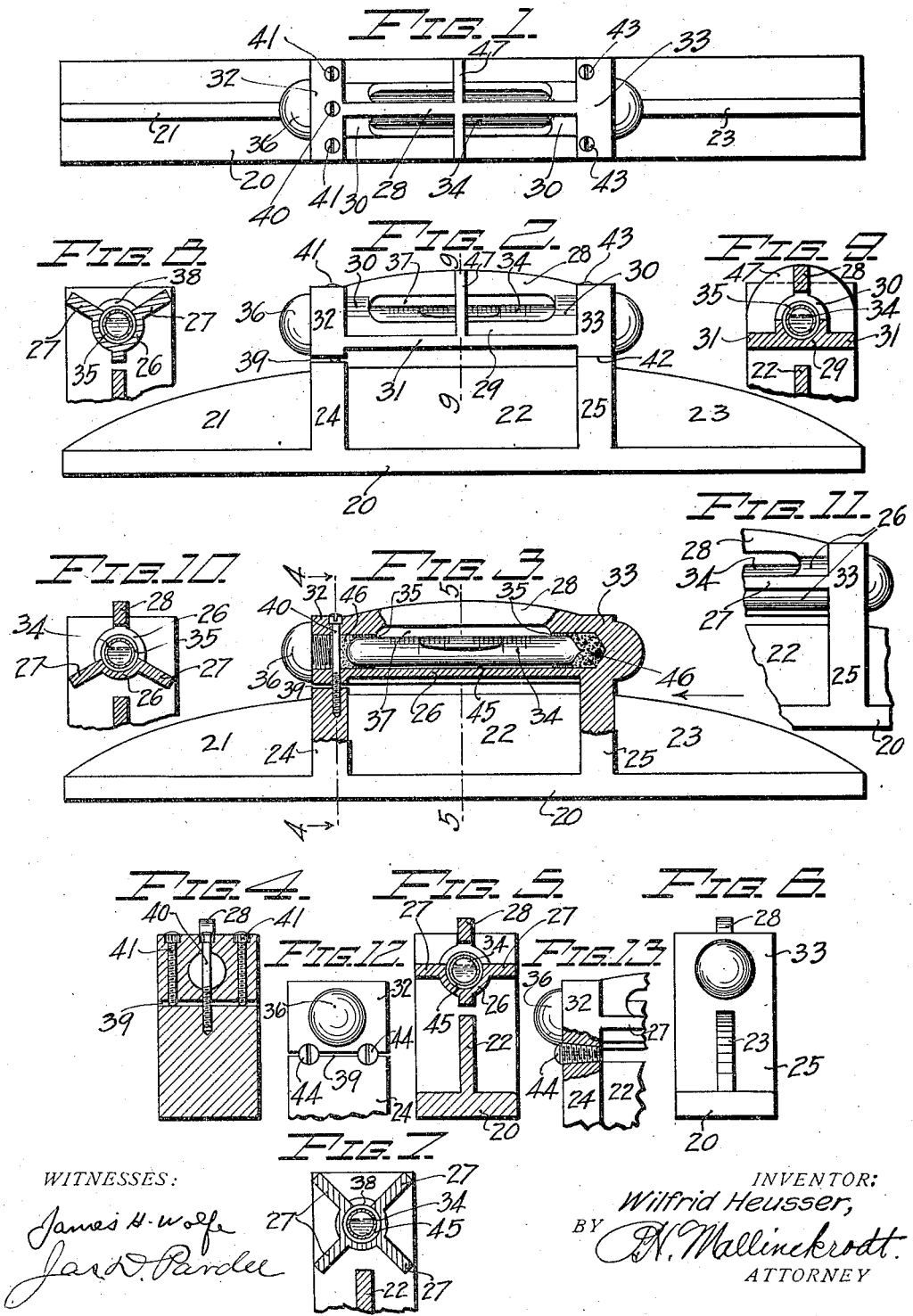
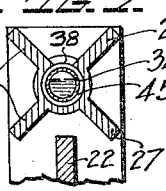
WITNESSES:
James H. Wolfe
Jas. D. Pardee
INVENTOR:
Wilfrid Heusser,
BY
N. Mallinckrodt.
ATTORNEY W. HEUSSER.
PRECISION LEVEL.
APPLICATION FILED APR. 20, 1915.
1,299,940.
Patented Apr. 8, 1919.
2 SHEETS—SHEET 2.
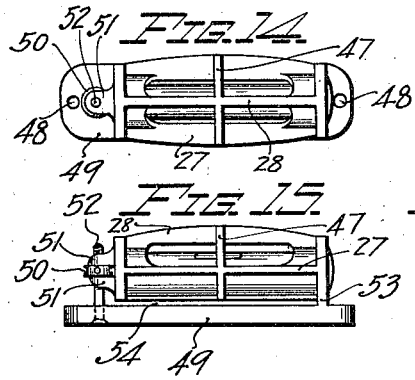
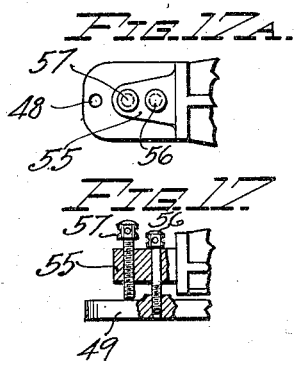
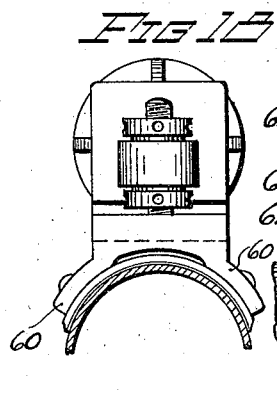
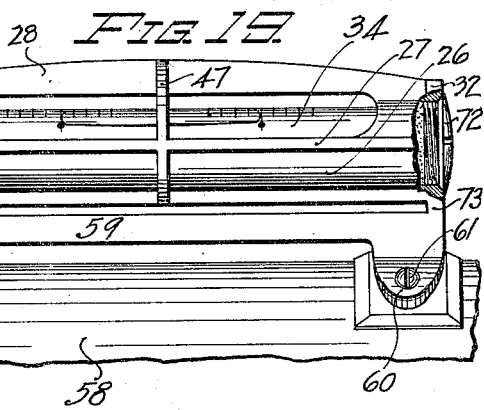
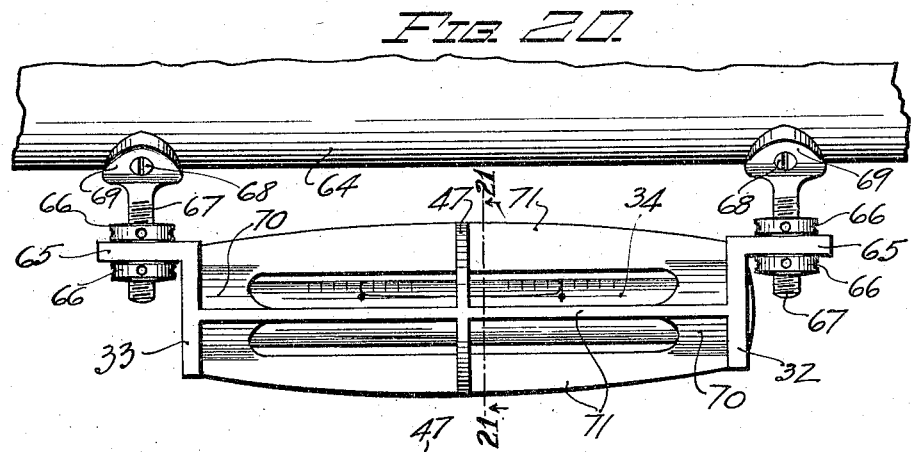
WITNESSES:
James H. Wolfe
Jas. D. Pardee
INVENTOR.
Wilfrid Heusser,
BY
Mallinckrodt
ATTORNEY

UNITED STATES PATENT OFFICE.

WILFRID HEUSSER, OF SALT LAKE CITY, UTAH.

PRECISION-LEVEL.

1,299,940. Specification of Letters Patent. Patented Apr. 8, 1919.

Application filed April 20, 1915. Serial No. 22,586.

*To all whom it may concern:*

Be it known that I, WILFRID HEUSSER, a citizen of Switzerland, and a resident of Salt Lake City, in the county of Salt Lake and the State of Utah, have invented certain new and useful Improvements in Precision-Levels, of which the following, together with the accompanying drawings, constitutes a full, clear, and exact specification, which will enable others skilled in the art to which my invention appertains to make and use the same.

My invention relates to precision levels for the use of mechanics, engineers and others requiring a high degree of accuracy.

The objects of my invention are:—

First. To provide an extremely sensitive level which shall be adapted to the more or less rough handling of everyday shop and field use and the fundamental design of which shall be applicable to mechanics' levels as well as to levels for engineering, and other similar instruments.

Second. To allow adjustments in the level to be made in such a way that the principal parts thereof will be as one solid structure with relation to each other.

Third. To provide a substantial housing for the level vial with comparatively heavy guards so the vial will be protected against accidental breakage through blows from outside objects.

Fourth. To indicate how much any certain work on which the instrument is being used may lack of being level.

Fifth. To provide a neat, durable level, composed of few separate parts, and which, in the type designed for the use of mechanics may be easily grasped, and securely held, by the hands of the workman.

Sixth. To safely expose a long area of the glass vial to the view of the user, so that a considerable amount of travel of the bubble can be observed.

Seventh. To make it possible for the user to view the vial from various convenient angles.

In attaining the objects named, my improved level consists essentially, in all its types, of a housing for strongly protecting the usual glass vial; this housing embraces two hollow heads which may form parts of suitably supported standards and in which the ends of the vial are secured, the heads being connected to each other by a series of guards spaced around, and extending longitudinally along the vial, with the guards projecting outwardly therefrom, preferably along radial lines. Intermediate annular guards may connect the longitudinal guards to each other.

The vial housing is usually provided with a base, the two parts being preferably connected at one point by a neck, integral with both, while at another point the two parts are connected to each other adjustably, so that the space between them may be slightly varied causing the neck to be stressed. In the case of levels for mechanics' use, the base may be in the form of an accurately finished straight edge and in the case of levels for engineering instruments, it may be provided with lugs or other means for securing the base to the instrument desired.

If preferred, however, my improved vial housing may be constructed separately and may be mounted in any way to suit the user.

The collective features upon which protection is desired are grouped in the appended claims.

In the drawings, Figures 1 to 13 both inclusive, illustrate my improvements embodied in levels for the use of mechanics and Figs. 14 to 21, illustrate the same improvements embodied in levels for use on surveying, or other similar, instruments.

Fig. 1 is a plan view of one form of the level.

Fig. 2 shows a side elevation corresponding to Fig. 1.

Fig. 3 shows a side elevation, partly in section on the longitudinal center line of a slightly modified construction.

Figs. 4 and 5 show sections taken on lines 4—4 and 5—5 respectively, in Fig. 3.

Fig. 6 shows an end elevation viewed in the direction of the arrow in Fig. 3.

Figs. 7, 8, 9 and 10 show fragmentary cross sections taken near the transverse center line and illustrating various modifications of details.

Figs. 11, 12 and 13 show fragmentary elevations illustrating further modifications of details.

Fig. 14 shows a plan view of a small level adapted for use on the plates of surveying instruments.

Fig. 15 shows a side elevation corresponding to Fig. 14.

Fig. 16 shows a transverse section taken near the center in Fig. 15.

Figs. 17 and 17^A are fragmentary views illustrating a modified detail.

Fig. 18 shows an end elevation of a level adapted for use on top of the telescope tube of a surveying instrument.

Fig. 19 shows a side elevation corresponding to Fig. 18.

Fig. 20 shows a side elevation of a level adapted for mounting on the underside of the telescope tube of a surveying instrument.

Fig. 21 is a section taken on line 21—21 in Fig. 20.

Similar parts throughout the different views, are designated by similar numerals.

Referring to the drawings, (Figs. 1 to 13 inclusive) the construction of the mechanics' level will be explained first. In its preferred form this level is made of cast metal or of steel drop forged and hardened, and comprises the sole plate (20) having the upwardly projecting rib consisting of parts (21) (22) and (23) with the intermediate standards (24) and (25).

Extending across the upper parts of the standards (24) and (25) is the vial housing which may be made of the tubular body portion (26) having longitudinal ribs or guards projecting laterally therefrom along radial lines; various arrangements thereof being shown in cross section in Figs. (5), (7), (8) and (10), or the body portion of the vial housing may be in the form of a grooved or channeled bed (29) having the tubular ends (30) and the laterally outstanding guards (31) shown in Figs. (1), (2) and (9). Of whatever shape the cross section of the body portion may be, it has at its extremities the hollow heads (32) and (33) which form the continuation of the standards (24) and (25) respectively.

The glass vial (34) is mounted in the bore of the tubular ends (30) and may be held in place therein by thin strips of cork or other resilient material wrapped around the ends of the vial and fitting snugly into the tubular ends as shown at (35) in Fig. 3. The housing is somewhat longer than the vial (34) in order to allow a space at each end thereof for filling with plaster of Paris or other suitable material as shown at (46) in Fig. 3.

One end of the housing may have the solid head (33) while the other end may be closed by any suitably shaped plug, for instance the round headed plug (36).

In the arrangements illustrated by Figs. (2), (3), (5) and (10) the tubular body portion (26) and the vertical guards (28) are partly cut away as shown at (37) for the purpose of disclosing the graduated scale and the bubble to the view of the user, but in the arrangements illustrated by Figs. 7 and 8, only the upper part of the tubular body portion need be cut away as shown at (38).

In any of the arrangements described, the longitudinal guards (27) and (28) may be connected to each other by one or more transverse guards (47) as shown in Figs. (1), (2) and (9), the purpose of which is both to brace the longitudinal guards and to afford additional protection to the glass vial.

To provide for adjustments in this level, any one of five different constructions may be used, as described below:—

(a) In which the standard (25) and the head (33), Fig. 3, are in one piece, while the opposite standard (24) and the head (32) may be separated by the gap indicated at (39), the two parts being connected by the tension screw (40). On either side of the tension screw is a thrust screw (41) which bears on the top of standard (24) and the action of these screws being opposed to the tension screw, they are adapted to take up any play or lost motion between its thread and the thread of the tapped hole in the standard (24). The adjustments are made by the actions of either the tension or thrust screws which decrease or increase the gap (39), as the case may be, and cause a bending stress in the metal in the upper part of standard (25) between the straight-edge and the level housing.

(b) This construction is similar to the one just described with the exception that the head (33) and the standard (25) are divided by the plane joint indicated at (42) the head and the standard being held together by the screws (43) as shown in Fig. 2.

(c) In which both heads of the level housing are separate from their corresponding standards but having the plane joints and the connecting screws, the method of joining the two heads and standards being the same as is illustrated at 25, 33 and 42, in Fig. 2. In this case, adjustments may be made by altering one of the contacting surfaces between the two parts.

(d) In which both heads of the level housing are integral with the corresponding standards as indicated in Fig. 11, the adjustments being made by grinding off the bottom surface of the sole plate (20) as may be required.

(e) In this case the general construction is similar to that illustrated in Fig. 3, with the difference, that instead of using the tension and thrust screws for adjusting the level, tapering screws (44), as shown in Figs. 12 and 13 engage correspondingly threaded holes between the head (32) and the standard (24) which extend across the gap (39). By turning the screws (44) so they will move inwardly, the level housing and the straight edge will be separated farther from each other at this end and will thus cause a bending stress in the metal in the standard (25) as in case (a).

The construction described under (a) is the one generally preferred. It allows easy and rapid adjusting and as the straight edge and vial housing may be one solid casting or drop forging, with the adjusting screws allowing a close, metal to metal contact in the threaded portions, a most rigid and substantial combination is made possible.

By the use of tension screws, with thrust screws set in opposition thereto, I obtain a device for adjusting the level which under normal conditions is absolutely unyielding to any jar or jolt.

It will be noticed that the vial (34) has a clearance space (45) (Fig. 3) between its a cylindrical surface and the body portion (26) of the housing, to prevent any stresses therein, from bearing on the glass.

By using graduated level vials of known sensitivity I am enabled to read directly from the vial scale the amount per unit length that an object may vary from the level. The sensitivity of the vials is usually such, that a variation of 1/1000 of one inch per foot will cause the bubble to move through one graduation on the scale.

The construction of this level as applied to surveying, or other similar, instruments is illustrated by Figs. 14 to 21 but in the descriptions following, specific mention will not be made of detailed parts which have already been fully described in connection with the preceding figures.

It will be understood, that any of the different details shown in any of the figures can be applied to the constructions shown in any of the remaining figures if it would at any time be advantageous to do so.

The type of level illustrated in Figs. 14, 15 and 16 is designed for use on the plates of surveying instruments, the level being fastened thereto by screws (not shown) passing through the holes (48) in the base (49). Adjustments are made by the capstan nut (50) turning between the lugs (51) and engaging the screw (52) which latter has its lower end secured in the base (49). The neck (53) is integral with both the vial housing and the base (49), and the gap (54) extends from the neck (53) to opposite end of the vial housing.

In the modification illustrated in Figs. 17 and 17ᴬ the integral lug (55) projecting from the vial housing, has the capstan-headed thrust screw (57) threaded therein and the capstan headed tension screw (56) threaded in the base (49) the operation of these oppositely acting screws for adjusting the level being similar to the construction described in connection with Figs. 3 and 4.

The level illustrated by Fig. 19 is mounted on the top of the telescope tube (58) of a surveying instrument. It consists of the base (59) having the outstanding feet or lugs (60) fastened to the telescope tube by the screws (61); the base (59) and the vial housing being integrally joined by the neck or stress-bearing member (73). The vial housing is closed by the countersunk screw (72). The integral lug (62) projecting from the housing and the capstan nuts (63) for adjusting the level are similar to the corresponding parts on ordinary surveying instruments and the remaining parts of the level are similar to the constructions already explained.

Fig. 20 shows a level mounted underneath the telescope tube (64) of a surveying instrument, the vial housing having projecting lugs (65) which are adjustably clamped by the common arrangement of capstan nuts (66) engaging the depending screws (67), the latter being fastened to the telescope tube by screws (68) passing through integral lugs (69). In this instance the vial housing has the central tubular body portion cut away entirely around the vial, leaving the tubular ends (70) connected only by the laterally projecting longitudinal ribs (71).

Having fully described my invention what I claim is:—

1. In a precision level, the combination with a base comprising a sole plate, having suitable standards projecting from one face thereof, of a housing adapted to receive a vial, intermediate the said standards; one of the said standards having a suitably located gap therein, and mutually opposing tension and compression screws, suitably disposed for adjusting the distance between the said sole plate and the said housing, by increasing or decreasing the extent of the said gap.

2. In a precision level, the combination with a ribbed sole plate, of a pair of upwardly projecting standards integral therewith, a vial housing intermediate the said standards, one of the said standards being separated into two parts by a gap located between the sole plate and the vial housing, and mutually opposing tension and compression screws for adjusting the position of the said housing relative to the said sole plate by increasing or decreasing the extent of the said gap.

3. In a precision level, the combination with a sole plate having upwardly extending ribs and a pair of standards intersecting the said ribs, of a vial housing having heads at the extremities thereof, one of the said heads being integral with one of the said standards, the other head being separated from the lower part of the other standard by a gap, and mutually opposing tension and thrust screws suitably disposed and adapted to allow the increasing or decreasing of the extent of the said gap as specified.

4. In a level, the combination with a suitable vial, of a housing therefor, comprising hollow heads adapted to hold the extremities of the said vial, a channeled base portion intermediate the said heads, a vertically disposed longitudinal guard over and clearing the said vial, a suitably disposed lateral guard joining the said channeled base and the longitudinal guard and means for securing the said vial in the said housing.

5. In a level, the combination with a suitable vial, of a housing therefor, comprising hollow heads adapted to hold the said vial, a channeled base portion partly inclosing the said vial and extending longitudinally thereof, the said base portion located intermediate the said hollow heads, a longitudinal guard suitably disposed above the said vial; the said base portion and the said guard being integral with the said heads, and means for securing the said vial in the said housing.

6. In a precision level, the combination with a base portion having an upwardly extending rib longitudinally disposed thereon, and a pair of upwardly extending standards intersecting the said rib, of a vial housing intermediate the said standards, the upper part of one of the standards forming an integral head for one end of the said housing, a second head at the other end of the said housing separate from the second standard, but located immediately thereabove with an intervening gap, longitudinal guards spaced around the central portion of the said housing and integrally connected to the said heads, and opposing thrust and tension-screws adapted to allow the varying of the extent of the said gap, at the same time allowing a metal to metal contact connection between the said base portion and the said vial housing.

7. In a level the combination with a base portion having suitable lugs for attaching to a surveying instrument, of a vial housing located over the said base portion and integrally connected thereto at one end by a stress-bearing neck, the said base and the said housing being separated by a gap extending forward from the said neck and means for adjusting the extent of the said gap at a point opposite the said neck.

8. In a vial housing for levels, the combination with a suitable tubular body portion adapted to have a vial mounted therein of longitudinal laterally projecting guards integral with the said body portion, suitable heads located at the extremities of the said body portion integral therewith and with the said guards, and intermediate annular guards integral with the said longitudinal guards.

9. In a level, the combination with oppositely disposed hollow heads adapted to have the ends of a suitable vial mounted therein, of longitudinal guards connecting the said heads, the said guards being spaced around the bore of the said heads, and intermediate annular guards connecting the said longitudinal guards to each other.

10. In a level, the combination with a base portion having suitable lugs for attaching to a surveying instrument, of a vial housing located over the said base portion and integrally connected thereto at one end by a stress-bearing neck, the said housing comprising oppositely disposed heads connected by integral longitudinal guards, the said longitudinal guards being connected to each other by intermediate annular guards; the said base and the said housing being separated by a gap extending forward from the said neck and means for adjusting the extent of the said gap at a point opposite the said neck.

11. In a level, the combination with a suitable housing adapted to hold a level vial, of a suitable base portion, a neck integral with both the housing and the base, and mutually opposing tension and compression screws connecting the said neck and the said base to each other, apart from the said neck, for the purpose specified.

In testimony that I claim this invention as my own I have signed my name hereto in the presence of two subscribing witnesses.

WILFRID HEUSSER.

Witnesses:
JAMES H. WOLFE,
P. H. MALLINCKRODT.

Copies of this patent may be obtained for five cents each, by addressing the "Commissioner of Patents, Washington, D. C."